United States Patent
Hashimoto

[11] 3,878,303
[45] Apr. 15, 1975

[54] TREATMENT OF ANIMAL WASTES

[75] Inventor: Saburo Hashimoto, Yorba Linda, Calif.

[73] Assignee: Union Oil Company of California, Los Angeles, Calif.

[22] Filed: July 12, 1973

[21] Appl. No.: 378,523

[52] U.S. Cl. .................. 426/56; 195/107; 71/9; 71/21; 210/15
[51] Int. Cl. .............................................. A23j 3/00
[58] Field of Search ....... 71/9, 21; 195/107; 210/15; 426/55, 56, 57

[56] References Cited
UNITED STATES PATENTS

| | | | |
|---|---|---|---|
| 2,220,700 | 11/1940 | Atwood .......................... | 195/107 X |
| 2,361,057 | 10/1944 | Ratzer................................. | 195/107 |
| 2,379,554 | 7/1945 | Tyler................................... | 210/15 |
| 2,572,823 | 10/1951 | Wallenstein et al............ | 195/107 X |
| 2,713,028 | 7/1955 | Jenks................................ | 210/15 X |
| 3,142,557 | 7/1964 | MacDuffie et al........................ | 71/9 |
| 3,151,063 | 9/1964 | Gunson............................... | 71/9 X |
| 3,203,893 | 8/1965 | House et al....................... | 210/15 X |
| 3,248,324 | 4/1966 | Sweeney ........................... | 210/15 X |
| 3,773,659 | 11/1973 | Carlson............................... | 210/11 |
| 3,778,233 | 12/1973 | Blough et al............................. | 71/12 |

*Primary Examiner*—Charles N. Hart
*Assistant Examiner*—Ferris H. Lander
*Attorney, Agent, or Firm*—Richard C. Hartman; Dean Sandford; Michael H. Laird

[57] ABSTRACT

A method is described for the treatment of animal wastes which facilitates the bacterial decomposition of the waste without many of the economic and operational hindrances of conventional waste treatment. According to the invention, an aqueous medium containing the animal waste is prepared and a foam stabilizer such as a surface active agent or a protective colloid is added to the resulting aqueous medium. The aqueous medium is then foamed into a stable foam with air in the discontinuous phase surrounded by the continuous aqueous medium. Preferably, the medium is innoculated with a bacterial culture before foaming. The foam is then discharged into the fermentation vessels where it is retained for a sufficient period of time, e.g., from about 3 to about 48 hours at a temperature from about 15° to about 60°C. to permit substantially complete bacterial decomposition of the animal waste products. Upon completion of the fermentation, the foam composition is removed from the fermentation vessel and a clear, aqueous effluent is separated for recycle in the process or for discharge. The bacterial cells can be concentrated from the aqueous medium by various solid-liquid separators and finally dried to recover cellular matter containing approximately 60 percent protein.

5 Claims, 1 Drawing Figure

PATENTED APR 1 5 1975    3,878,303
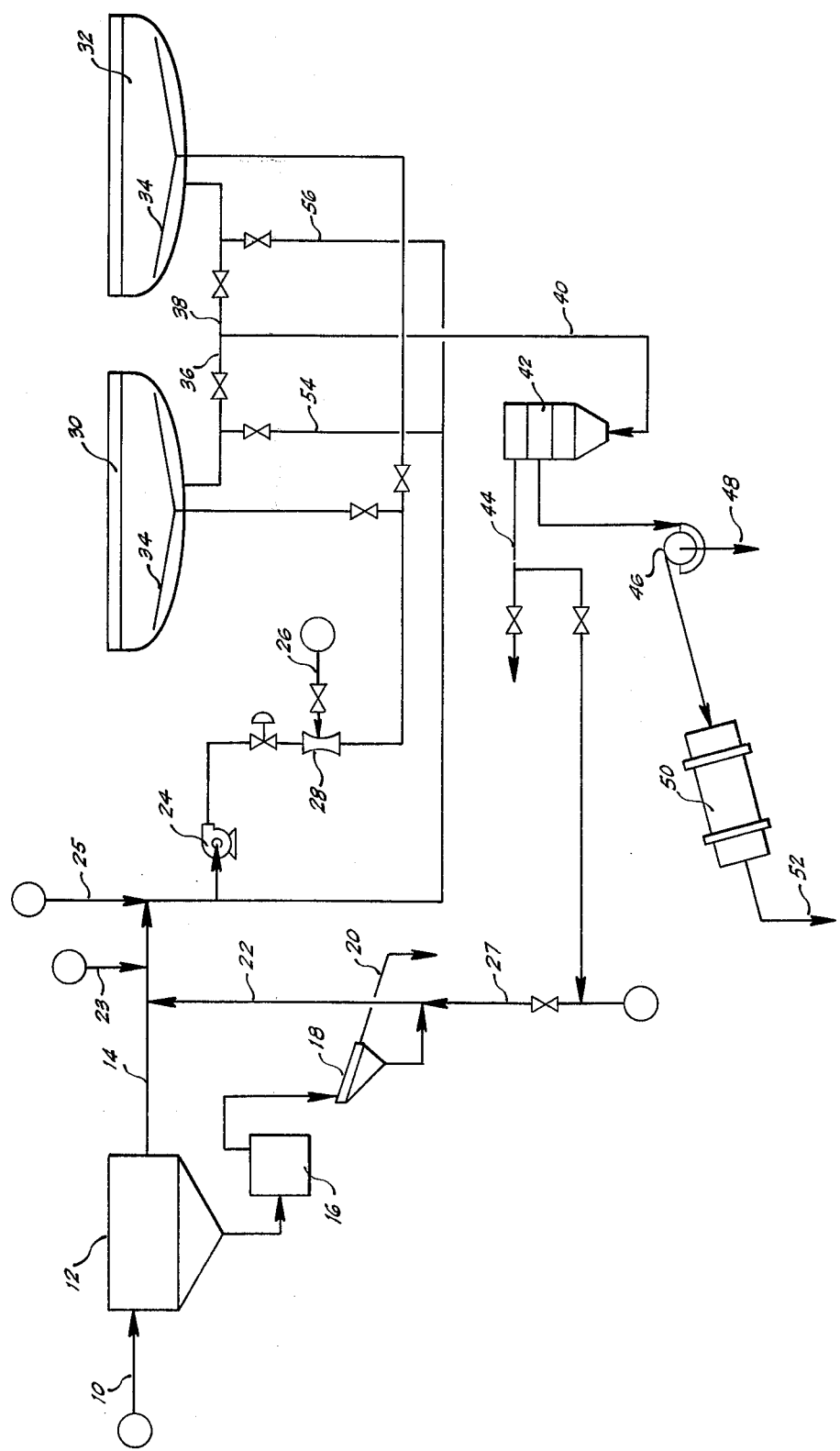

TREATMENT OF ANIMAL WASTES

BACKGROUND OF THE INVENTION

This invention relates to a biochemical process and, in particular, relates to a biochemical process for the treatment of waste animal products.

Approximately two billion tons of animal waste are produced each year in the United States. These wastes comprise liquid and fecal wastes and used bedding. It is estimated that the amount of this waste is equivalent to a human population of approximately two billion. About half of this waste is produced in sufficient concentration to permit its treatment. The extent or magnitude of the waste production can be illustrated by reference to a typical feedlot of about 5000 head of cattle which produces from about 50 to about 120 tons of manure per day.

Because commercial fertilizers are less expensive to purchase and apply and because these fertilizers are free of the high salt content which characterizes animal wastes, the historic practice of using animal wastes as fertilizers has been gradually discontinued. Accordingly, the problem of disposing of animal wastes is of increasing concern and magnitude.

The animal wastes are normally accumulated and stored adjacent to the feedlot or dairy operation. The resulting anaerobic decomposition of the waste forms odors and is a breeding ground for pests. Drainage waters from the accumulation can seep into the soil and contaminate surface waters. Even in instances where adequate filtration of drainage waters exists, water soluble materials such as nitrates are carried into the fresh water supply, contributing to the problem of high nitrate contents of this water. It is generally desirable that the operations such as dairy farms or egg ranches be located in the proximity of the population centers to be adjacent the market areas. The offensive odors which are formed from the animal wastes, however, cause nuisances and frequently require location of these operations at a substantial distance from their markets.

Some attempts at treatment of animal wastes have been made by providing holding ponds or lagoons for water decomposition or by burning the solid refuse. These methods have not been entirely satisfactory. Decomposition in the holding ponds should desirably be under aerobic conditions to decrease the extent of the obnoxious odors which are formed. The large volume of the lagoon and the extensive sparging with air that is required results in an uneconomical practice. To illustrate, a digestion time of about 15 days is typical of such operations and the aforementioned feedlot operation would require approximately one-half to one acre of surface area of an aeration lagoon having a depth of 8 feet to permit handling of all of its animal wastes.

Various methods have been suggested to facilitate waste decomposition. U.S. Pat. No. 3,732,089 and the prior patents cited therein describe microorganism treatments of animal wastes. These methods, however, do not obviate the major difficulty of treatment of animal waste which is the extensive or prolonged time which is necessary in the digestion period. Accordingly, it is desirable to provide a process for the rapid and efficient aerobic decomposition of animal wastes.

BRIEF STATEMENT OF THE INVENTION

Animal wastes are treated in accordance with the invention by liquefying the wastes in an aqueous medium, decanting the medium to separate solid matter, pulverizing the separated solid matter to a fine degree of subdivision, reblending it with the liquid medium to form a suspension of the animal waste, adding a foam stabilizer selected from the class of surface active agents and protective colloids to the liquid medium, forming a stable foam by the discharge of a pressured supply of air or an oxygen-containing gas into admixture with the liquid medium, and holding of the resultant foam for a period of 3 to 48 hours while maintaining its temperature from 15° to about 60°C. to effect the aerobic decomposition of the animal wastes. The crude decomposition product can be withdrawn and subjected to conventional solid-liquid separation techniques to recover the solid microorganism from a clear aqueous effluent that can be recycled to the process or discharged from the plant. Some of the microorganisms can, of course, be recycled to innoculate the liquid medium before formation of the stable foam.

This method provides a greatly reduced period for digestion of the animal wastes and thereby substantially reduces the amount of storage or digestion capacity necessary for a typical plant installation. The method also requires a considerably lesser amount of energy and avoids the constant sparging or stirring that would be necessary in the absence of the foam. The process is also substantially free of the formation and release of odoriferous gases since the treatment is performed under entirely aerobic conditions and any odoriferous gases which are formed in the initial stages of the decomposition are retained, trapped in the discontinuous air phase for a sufficient period of time that their oxidation to innocuous gases occurs.

BRIEF DESCRIPTION OF THE DRAWING

The FIGURE is a flow diagram of the process.

DESCRIPTION OF THE PREFERRED EMBODIMENTS

Referring now to the FIGURE, the waste liquid from the animal operation enters the process at 10. This comprises a liquid suspension of excrement from the cattle or poultry which contains dissolved and suspended animal wastes as well as used bedding material. This suspension is passed into a large vessel 12 in which the suspended solid matter is permitted to settle and a liquid relatively free of suspended solids is decanted through line 14. The solids which settle to the bottom of vessel 12 are removed therefrom for discharge. Preferably, these solids, too, are treated by the invention and are passed into a suitable comminuting means 16 such as a hammer mill. These solids are reduced to a fine degree of subdivision in comminuting means 16 and are then passed to a suitable screening means 18 wherein the oversized solids are removed through line 20 for disposal or for return to the comminuting means 16. The solids which have been subdivided to pass a screen having a size from 50 to about 300 standard mesh are then passed to line 14 for suspension in the liquid rich in animal wastes. If desired, additional fresh water can be added through line 21 to aid in the suspension of the solid material and its flow through line 22. The concentration of animal wastes in stream 14 is adjusted by the addition of fresh or recycled water to a level from 1 to about 10 weight percent, preferably from about 3 to about 7 weight percent. Of these wastes, about 15 to about 35 weight percent of the solids are inorganic salts which are dissolved in the water and the remainder are suspended organic matter.

The animal wastes contain bacteria which can decompose the waste under aerobic conditions and no additional bacteria cultures need be added. It is preferred, however, to add a culture which is in its active growth phase and thereby reduce the required time of treatment. Accordingly, the liquid rich in animal wastes is then admixed with a suitable culture medium, from line 23, of microorganisms that are active for effecting the aerobic decomposition of the animal wastes contained in stream 14.

Foam stabilizing additives, described in greater detail, are added to the liquid in line 14 through line 25. The resulting mixture is then discharged into the suction of pump 24 which raises its pressure to about 25 to about 250 psig. The pressured liquid medium is then admixed with air that is introduced through line 26 and into admixture with the liquid rich in animal wastes under conditions to form a foam product. This can be accomplished by using conventional foaming apparatus such as a plurality of aspirator nozzles generally indicated at 28 in which the liquid is passed through a venturi-type nozzle and air is aspirated into admixture with the liquid through a plurality of parts in the nozzle. Other foaming means can be used, e.g., the foam generator pump manufactured and marketed by Waukesha Foundry Company. In this apparatus, the liquid is passed through a flexible vane pump and injected through a hollow drive shaft into a coaxial air blower. The liquid is foamed in admixture with the air in the latter pump and a finely divided foam is discharged from the apparatus.

The foam is then discharged into one or more of a plurality of digestion vessels 30 and 32. These vessels can be in the form of lined lagoons which are excavated into the earth or can be of metallic construction for installation above or beneath the earth's surface. Because the process does not release any significant amounts of odoriferous gases, the vessels 30 and 32 need not be covered. The foamed liquid can be discharged into these vessels from a distributor 34 which is located at the bottom of each of these vessels. The foam can be introduced to provide a foam height within the vessel of from 5 to about 50 feet, preferably from about 10 to about 25 feet.

The foamed liquid is retained within the digestion vessels 30 and 32 for a sufficient time to permit the substantially complete aerobic decomposition of the animal wastes. The length of the digestion varies considerably with the activity of the particular microorganism. The process is preferably continued throughout the period of exponential growth rate of the microorganism, a period that can be from about 3 to about 48 hours; preferably the fermentation time is from 10 to about 20 hours. The temperature of the liquid is maintained at an optimum for growth; generally from 15° to 60°C.; preferably from 20° to 45°C. This temperature can be maintained by preheating the air and liquid before foaming or by use of heating coils placed in the digestion vessels 30 and 32.

Upon completion of the digestion within the vessel 30 or 32, the liquid contents are removed through lines 36 or 38 into line 40 which passes to conventional solids-liquid separation means such as one or more centrifuges 42. A substantially clear effluent liquid is removed through line 44 for discharge from the process or for use as a supply of the water added through line 27 or used to prepare the animal waste liquid suspension introduced into the process by line 10.

The solids removed in the centrifuge 42 can be passed to a conventional vacuum filter 46 where another clear aqueous effluent is removed through line 48 for removal from the process or to supply water to the process. Solids removed in the filtration unit 46 are then passed to a conventional gas-fired dryer 50 where they are reduced to a dry powder that is removed by line 52. The dry powder can be used for a fertilizer or can be used as a source of protein for animal feed supplements.

Suitable microorganisms that can be used to innoculate the liquid rich in animal wastes by introduction through line 23 comprise bacteria which are active in aqueous media for the aerobic digestion of animal wastes. Examples of suitable bacteria include the following:

| | |
|---|---|
| Achromobacter | liquefaciens |
| " | iophagum |
| " | delicatulum |
| " | cycloclastes |
| " | superficiale |
| Bacillus | enteromyces |
| " | equi |
| " | rubescens |
| " | sulfhydrogenus |
| " | thermoamylolyticus |
| " | thermophilus |
| " | pasterui |
| " | thermocellulolyticus |
| " | thermoliquefaciens |
| " | cincinnatus |
| Bacillus | coprogenes |
| " | diffrangens |
| " | penicillatus |
| " | saprogenes |
| Bacterium | canalis parvum |
| " | pseudomultipediculum |
| Escherichia | psuedocosoroba |
| " | coloides |
| Nitrocystis | sarcinoides |
| " | micropunctata |
| Nitrosogloea | merismoides |
| " | schizobacteroides |
| " | membranacea |
| Pseudomonas | aeruginosa |
| " | fluorescens |
| " | ureal |
| " | effusa |
| Thiobacillus | thiooxidans |

The bacteria will be active in the aqueous medium at concentrations from about 0.05 to about 5 weight percent. The bacterial culture is introduced at a concentration from about 0.05 to about 2.5 weight percent, preferably from about 0.1 to 1 weight percent of the liquid medium, and is maintained at conditions favoring its exponential growth to approximately double its concentration in the aqueous medium while in the digestion vessels 30 and 32.

The culture of bacteria that is introduced through line 23 to innoculate the liquid stream in line 14 is at its exponential growth phase rather than an initial lag phase or the steady or stationary phase. To continue the propagation of the bacteria, a suitable portion of the bacteria is removed from the process while it is still in the exponential growth phase and is used to innoculate the succeeding batches of liquid introduced through line 14.

It is desirable that a foam having a stability for substantially the entire period of the digestion be employed. As described in succeeding paragraphs, various foam stabilizing agents are added through line 25 to effect stabilization of the foam. In some instances, it may be found that the foam does not remain stable throughout the entire period required for the substantially complete decomposition of the animal wastes in vessels 30 and 32. In these instances, the liquid can be refoamed by withdrawing the liquid through lines 54 or 56 and passing the liquid into the suction of pump 24 for repressuring and refoaming through the aspirator nozzles 28. This may become necessary when very prolonged periods of digestion, e.g., in excess of about 48 hours, are necessary.

The proportion of the gaseous agent employed in the discontinuous phase which is air or an oxygen-containing gas can be from about 3/1 to about 50/1 volumes per volume of liquid. Preferably, the volumetric proportion is from about 5/1 to about 20/1 and, most preferably, from about 7/1 to about 15/1 parts of discontinuous gas per part by volume of the continuous liquid phase. With any of the foaming agents or stabilizers, the relative proportion of air to liquid will control the stability of the foam. The drier the foam, i.e., the higher the proportion of air in the foam, the shorter will be the foam's stability. Accordingly, the volumetric ratio of air to liquid can be varied inversely to the desired length of time for digestion that is required. Control of this variable will, therefore, provide a foam which will collapse after the digestion in the holding vessels 30 and 32 has been substantially completed so that the difficulties in separating solid matter from a foam are avoided. It will be found that for most applications, the aforementioned preferred and most preferred air-to-liquid volumetric ratios will provide the necessary digestion time.

The stability of the foam can be controlled by various means. In the preferred method, foaming agents and/or foam stabilizers are employed that will provide foams having stabilities of from 15 minutes to about 48 hours. The foaming agents include various oil-in-water surface active agents such as nonionic, cationic and anionic surfactants which are well known in the art. The foam stabilizers include any of the well known water soluble polymers and fatty amines which have been used as protective colloids in various aqueous suspension and emulsion techniques. Illustration of these various materials will be set forth in succeeding paragraphs.

Various surface active agents can be added to achieve the lowered surface tension of the water and various water soluble polymers and viscous additives can be added to enhance the viscosity of the water and thereby stabilize the foam. Various mechanical techniques can be employed to produce the foam from the aqueous medium and the hydrocarbon vapor, e.g., a froth can be produced by admixing the aqueous medium and the gaseous agent under high mechanical agitation or, preferably, the gaseous agent can be injected immediately upstream of a mixing nozzle which discharges the aqueous medium and produces a foam.

The surface active agents which can be added to water to reduce its surface tension from about 70 dynes per centimeter to a value of about 15 to about 50 dynes per centimeter, preferably to about 20 to about 40 dynes per centimeter, can in general be any of the conventional oil-in-water surfactants. The amount of the surface active agent so added can vary from about 0.01 to about 10, preferably from about 0.5 to 5 weight percent, and such surface active agent can be of the cationic, anionic or nonionic type.

Examples of the cationic surfactants include: fatty amines, e.g., dodecylamine, octadecylamine, (Armeens, Duomeens of Armour Chemical Company); alkarylamines, e.g., dodecyl aniline, fatty amides such as fatty imidazoliens, e.g., undecylimidazoline prepared by condensing lauric acid with ethylene diamine or oleylaminodiethylamine prepared by condensing the oleic acid with diethylamine hydrochloride (Sapamine ECH by Ciba); quaternary alkyl and aryl ammonium salts and hydrates, e.g., cetyltriethyl ammonium cetyl sulfate, dimethylbenzyldodecyl ammonium chloride, etc.; quaternary ammonium bases of fatty amides of disubstituted diamines, e.g., oleyl methylamino ethylene diethylamine, methyl sulfate (Sapamine MS by Ciba), oleylbenzylamino ethylene diethylamine hydrochloride (Sapamine ECH by Ciba); fatty derivatives of benzimidazolines such as are prepared by condensation of a fatty acid with orthophenylenediamine followed by alkylation of the condensate with a alkyl halide to yield an N-alkyl alkylbenzimidazole, e.g., N-methyl N,N'-diethyl heptadecylbenzimidazole; N-fatty alkyl pyridinium compounds, e.g., lauryl pyridinium, octadecyl pyridinium (Fixanol of Imperial Chemical Industries), octadecyl methylene pyridinium acetate, etc. The fatty amines also stabilize the foams and can be used without any additional foam stabilizer or can be used with any of the other surfactants described herein to active foams that are quite stable and resist collapse for periods of from 5 to to about 250 minutes or longer, depending on the concentration of the fatty amine.

Examples of useful anionic surface active agents include the following: fatty acid glyceride sulfonates and fatty acid sulfonates, e.g., sulfonated cottonseed oil, sulfonated oleic acid, sulfonated sperm oil, sulfonated tallow, etc.; sulfonated fatty amides, e.g., sulfonated amide of rinoleic acid (Humectol CA by I. G. Farben), sodium salt of sulfuric ester of oleyl diisobutyl amide (Dismulgen V of I. G. Farben), etc.; sulfonated anilides of fats, e.g., sodium salt of sulfuric ester of oleylethyl anilide (Humectol CX by I. G. Farben), etc.; amides of aminosulfonic acids, e.g., sodium sulfonate of oleylmethyl tauride (Igepon T by I. G. Farben); amides from condensation of fatty acid chlorides with amino acids, e.g., sodium salt of oleyl sarcoside (Medialan A by I. G. Farben); sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates, octadecylbenzene sulfonates, etc.

Illustrative nonionic compounds include the polyethylene oxide condensates with hydrophobic groups having a reactive hydrogen. The hydrophobic group can have from about 10 to 25 carbon atoms and from 2 to about 15 molecular weights of ethylene oxide are commonly condensed per molecular weights of hydrophobic group. The hydrophobic group can be selected from a variety of organic compounds having one or more reactive hydrogens including fatty alkyl or alkenyl alcohols, fatty acids, fatty amines, fatty amide, esterified hexitans or alkyl or alkenyl phenols.

As described, the source of the hydrophilic group is ethylene oxide. Other source materials can be employed, for example, ethylene chlorohydrin, or polyethylene glycol; however, because of its low cost and availability, ethylene oxide is used almost exclusively in the preparation of these materials.

The hydrophobic reactant can comprise an alkyl or alkenyl phenol wherein the alkyl or alkenyl group or groups contain between about 2 and about 16 carbon atoms. Among such compounds are the following: hexyl phenol, hexenyl phenol, hexadecyl phenol, dodecenyl phenols, tetradecyl phenol, heptenyl cresol, isoamyl cresol, decyl resorcinol, cetenyl resorcinol, isododecyl phenol, decenyl xylenol, etc. Examples of commerciall available wetting agents belonging to this class and having a fatty acid constituent and containing ethylene oxide are the following: "Ninosol 100", "Ninosol 200" and "Ninosol 210" of the Alrose Chemical Company and "Napalcol 4-D" of the Nopco Chemical Company.

A third class of hydrophobic reactants comprises the alkyl and alkenyl alcohols containing between about 8 and about 22 carbon atoms. Among such alcohols are dodecanol, tridecanol, tetradecanol, pentadecanol, hexadecanol, heptadecanol, catadecanol, decosenol, etc. A commercially available wetting agent of this type and containing ethylene oxide is Brij 30 of The Atlas Powder Company.

A fourth class of the hydrophobic reactants comprises long chain alkyl or alkenyl amines or amides containing between about 8 and about 22 carbon atoms. These compounds contain two reactive hydrogens and the polyethylene oxide units are distributed therebetween. Examples of such compounds are dodecanamide, tridecylamine, tetradecenamide, pentenyl amine, hexadecyl amine, heptadecanamide, octadecyl amine, oleic amide, etc. Examples of commercially available wetting agents in this group containing ethylene oxide are "Ethomide" of The Armour Chemical Company and "Priminox 10" of the Rohm and Haas Chemical Company.

Another class of suitable wetting agents are the reaction products of ethylene oxide with fatty acid partial esters of hexitans. Such compounds are obtained by treating a hexitol, e.g., sorbitol, manitol, dulcitol, etc.; with a dehydrating agent to form the corresponding hexitan, i.e., sorbitan, mannitan, dulcitan, etc. The hexitan is then partially esterified with a long chain fatty acid, having between about 8 and about 22 carbon atoms, such as dodecanoic acid, pentadecanoic acid, hexadecanoic acid, oleic acid, stearic acid, etc., to replace one of the reactive hydrogens of the hexitan with the carboxylic radical. The resultant partial ester is then reacted with ethylene oxide. Commercially available compounds of this type are "Tween 65" and "Tween 81" of The Atlas Powder Company.

Very suitable emulsifiers comprise the organic substituted ammonium salts of sulfodicarboxylic acids that are reacted with various hydrophobic groups such as fatty amides having 12 to 18 carbons to prepare half amides in the manner described in U.S. Pat. No. 2,976,209, or with fatty amines having 2 to 26 carbons to prepare half amides in the manner described in U.S. Pat. No. 2,976,211, or with polyethoxylated fatty amines in the manner 12 in U.S. Pat. No. 3,080,280, or with fatty acid esters of hydroxyl amines to obtain half amides in the manner described in U.S. Pat. No. 2,976,208.

The surfactant will not interfere with most microorganism recovery steps. In some instances, however, the foaming tendency which it imparts to the liquid may be objectionable and, in such instances, the biodegradable surfactants constitute a preferred class of foaming additives. These surfactants are those possessing a hydrophobic portion having a predominantly straight chain aliphatic structure which is free of quaternary carbon atoms. Examples of these include alkyl sulfates, alkyl and alkenyl sulfonates as well as alkyl benzene sulfonates wherein the alkyl chain is substantially linear and does not possess a quaternary carbon near its free end. Nonionic surfactants such as straight chain polyglycols are also readily biodegradable. These biodegradable surfactants are oxidized by Pseudomonadaceae gram negative bacilli. To avoid interference of the surfactant with subsequent processing, e.g., with the recovery of the microorganisms, the aqueous medium can be innoculated with a species of the aforementioned bacilli which will slowly oxidize the surfactant during the fermentation. If, after the last fermentation step, the surfactant is still present in objectionable quantities, the aqueous medium can be passed to a hold tank maintained at optimum environmental conditions, with aeration and a temperature of about 30°-45°C. for a sufficient time, approximately 3 to 12 hours, to permit the microorganisms to oxidize the surfactant and reduce its concentration to manageable levels.

Various viscous additives can also be added to the aqueous medium to increase its viscosity and thereby serve to enhance or stabilize the foam. These viscous additives are a class of water soluble polymers of natural or synthetic origin which are commonly used as protective colloids. These polymers commonly have molecular weights from 10,000 to 5,000,000 and can be naturally occurring materials, e.g., proteins, alginates, cellulose ethers or entirely synthetic polymers, e.g., polyvinyl alcohol, partially hydrolyzed polyacrylamide, maleic acid or anhydride copolymers, polyvinyl pyrrolidone and copolymers thereof, etc.

Examples of proteinaceous materials include the naturally occurring vegetable and animal proteins having molecular weights from about 34,000 to about 200,000. Examples of such include casein with a molecular weight of from about 12,000 to 98,000; edestin with a molecular weight from about 29,000 to 200,000; hemoglobin having a molecular weight from about 16,000 to 67,000; egg albumin having a molecular weight from about 33,000 to 34,000 or serum albumin having a molecular weight from about 70,000 to 80,000. Other proteins include glutenin obtained from wheat, keratin obtained from animal horn and hoof, etc. Ease of solubility can be attained by partial hydrolysis of the aforementioned proteinaceous materials in accordance with common practice.

The maleic polymers include copolymers and partially hydrolyzed copolymers of maleic anhydride or acid with interpolymerizable vinylidene monomers such as vinyl acetate, vinyl methyl ether, ethylene, isobutylene or styrene. These polymers can be prepared by conventional polymerization and, optionally, can be partially hydrolyzed in an aqueous medium at an elevated pH and temperature for a few minutes to several hours to promote water solubility. Also useful are polyvinyl pyrrolidone or copolymers of vinyl pyrrolidone and interpolymerizable vinylidene monomers such as vinyl methyl ether, vinyl acetate, vinyl butyl ether, styrene, etc.

Illustrative of commercially available polyvinylpyrrolidone are type NP, molecular weight of 40,000; K-60 molecular weight of 150,000 and K-90 molecular weight of 300,000.

Another class of suitable viscous additives include the partially hydrolyzed polyacrylamides and copolymers thereof with vinyl monomers such as vinyl acetate, methyl methacrylate, ethyl acrylate, methyl vinyl ether, having from 5 to about 80 percent of the amide groups hydrolyzed to carboxylic acids and water soluble salts thereof, e.g., the alkali metal, ammonium and alkaline earth metal salts such as sodium, lithium, calcium, magnesium, etc. The polyacrylamides are obtained by conventional vinyl polymerization using a free radical initiator to produce a high molecular weight polyacrylamide which can be partially hydrolyzed simultaneously with, or subsequent to its polymerization. The hydrolysis of the polymer can be achieved by prolonged exposure of the polymer to elevated pH and temperature conditions, e.g., treatment of an aqueous solution containing from about 2 to about 15 percent of a polyacrylamide with an aqueous solution of sodium bicarbonate, sodium-polyphosphate, trisodium orthophosphate, etc., at a pH of about 8 to 12 and a temperature from about 30° to 100°C. The hydrolysis is performed for a period of from about 2 to about 10 hours and sufficient to effect hydrolysis of from 5 to 8, preferably from about 12 to about 67 percent of the amide groups to carboxylic acid or the aforementioned soluble carboxylate groups.

Other additives that can be used to increase the viscosity of the material include the water soluble polyvinyl alcohol and partially hydrolyzed polyvinyl acetate or copolymers thereof with vinyl monomers such as allyl alcohol, ethyl acrylate, methyl methacrylate, methyl vinyl ether, butyl vinyl ether, etc. The polyvinyl alcohol is obtained by hydrolysis of polyvinyl acetate which, in turn, is obtained by the free radical solution, bulk or emulsion polymerization of vinyl acetate using a free radical initiator. The polyvinyl acetate is thereafter hydrolyzed by conventional means, e.g., an aqueous solution of the polymer is maintained at an elevated temperature from 50° to 125°C. for a period of from 15 to about 240 minutes, sufficient to hydrolyze the acetate groups. The resultant polyvinyl alcohol is thereafter recovered from the aqueous medium by conventional means, e.g., spray drying.

Other water soluble materials that can be used to enhance the viscosity of the aqueous medium include various water soluble alginates, e.g., sodium alginate, potassium alginate, etc., as well as various cellulose derivatives such as carboxymethyl cellulose, hydroxyethyl cellulose, etc.

When the viscous additive is used as a foam stabilizer, it is employed in a sufficient concentration to increase the viscosity of water to a level of about 5 to about 200 centipoises measured at 25°C., preferably to a viscosity of about 15 to 75 centipoises. Of the aforementioned viscous additives, the proteinaceous materials are preferred since they exhibit desirable properties upon drying of the foam by maintaining the cellular integrity of the foam even though the water medium is evaporated from the foam.

The concentration of the surfactant and/or foam stabilizer can be varied to adjust the stability or life of the foam. The various surfactants and stabilizers form foams having varied stability for each surfactant or combination of surfactant and stabilizer. Generally, however, the surfactant and stabilizer exhibit their maximum effectiveness at concentrations from about 0.1 to 10 weight percent, preferably from about 0.5 to 5 weight percent. Within this range, the concentration can also be varied to control the life of the foam.

As apparent to those skilled in the art, the surfactant and/or viscous additive to be used should be checked for toxicity to the particular microorganism that will be used. This can be simply performed by preparing several test culture media of the microorganism with and without the foaming additives. The culture media are then incubated at their optimum temperature in an atmosphere rich in oxygen. The culture medium is checked for growth after several hours to confirm that no inhibition of growth is present in the medium containing the foaming additives.

The process as thus described greatly reduces the period of digestion of animal wastes. The foam provides a greatly increased surface area for effecting mass transfer between the oxygen in the air, which is the discontinuous phase, and the liquid, which is the continuous phase of the foam. Accordingly, the decomposition of the animal waste is performed under conditions which insure aerobic fermentation.

The following will illustrate the practice of the invention:

EXAMPLE

The embodiment of the invention is illustrated with regard to a typical feedlot operation of 5000 head of cattle. The solid and liquid wastes comprise about 100 tons per day of manure having the following composition:

| | | | |
|---|---|---|---|
| Organic matter | 17 | weight | percent |
| Moisture | 80 | " | " |
| Ash | 3 | " | " |
| Nitrogen | 0.5 | " | " |
| Phosphorus, as P$_2$O$_5$ | 0.3 | " | " |
| Potassium, as K$_2$O | 0.5 | " | " |
| Calcium | 0.3 | " | " |
| Magnesium | 0.2 | " | " |
| Other metals, including copper, manganese, zinc | 0.1 | " | " |
| Sulfur | 0.05 | " | " |

The wastes are admixed with water to provide a liquid stream of 94,000 gallons per day having a suspended solids content of about four weight percent. The liquid is passed to a vessel where larger solids are permitted to settle. The settled solids are withdrawn and passed through a hammer mill type grinder to pulverize the solids until most of the solids will pass a 50 U.S. Standard mesh screen. The pulverized and screened solids are then returned to the liquid suspension decanted from the settling vessel.

This liquid suspension is innoculated with two weight percent of a culture of *Bacillus enteromyces* and *thermocellulolyticus* which is in its exponential growth phase. Foam stabilizing additives comprising 0.1 weight percent of keratin obtained from animal horns and hoofs and 0.05 weight percent of lauryl sulfonate are added and the liquid is then passed to a Waukesha foam generator operating at 1900 revolutions per minute and discharged as an expanded foam with air as the discontinuous phase at an air-to-liquid volumetric ratio of 14. Nine generators are used, each driven by an electric motor of 2 horsepower. The liquid is heated to a temperature of about 100°F. before foaming and air at a temperature of about 100°F. is used to form the foam.

The foam is discharged into an open earthen excavation which is 80 feet wide and 200 feet in length. The depth of the excavation is from 5 to 15 feet with liquid withdrawal lines being provided in a sump located at its deep end. Three of these pools are provided and are rotated in a three-day cycle with one day to fill, one day of holding time and one day to empty. During its period in the pool, the foam temperature remains relatively constant at about 90°–110°F.

On the third day, the liquid is pumped from the pool. The foam has substantially diminished in volume by its collapse and the foam remaining is washed with fresh water into the suction of pumps for transferring to centrifuges and vacuum filters where the solid microorganisms are removed. The separated solids are dried to recover a dry solid containing about 50–60 weight percent protein which is useful as a source of protein for animal feeds. Some of the liquid separated in the solids recovery is returned to the process in admixture with fresh water while the remainder, about 10 to 35 percent, is discharged as waste water.

Because the fermentation is performed under aerobic conditions, few if any obnoxious and odoriferous gases are formed. Additionally, any odoriferous gases which are formed are trapped in the discontinuous gas phase of the foam and are retained therein for prolonged periods where they undergo further oxidation and decomposition to innocuous gases. As a result, the entire digestion can be performed in open vessels or lagoons without becoming a nuisance to the surrounding area.

The invention has been described with reference to a presently preferred and illustrated mode of practice thereof. It is not intended by this disclosure that the invention be unduly limited to the illustrated embodiment. Instead, it is intended that the invention be defined by the means, steps, reagents, and their obvious equivalents set forth in the following claims:

I claim:

1. The method of aerobically converting animal wastes to protein by aerobic decomposition of said wastes which comprises admixing (1) a liquid medium rich in animal wastes containing about 1 to about 10 weight percent dissolved and suspended animal excrement, (2) an aqueous culture medium of aerobic bacteria in an amount sufficient to provide a concentration of bacteria in an aqueous medium between about 0.05 and about 2.5 weight percent, said bacteria being in an exponential growth phase and (3) a foam stabilizing additive selected from the group consisting of protective colloids and surface-active agents in an amount sufficient to reduce surface tension of said aqueous culture medium to within the range of about 15 to about 50 dynes per centimeter and combinations of said protective colloids and surface active agents, admixing the resultant liquid medium with an oxygen-containing gas under conditions sufficient to form a stable foam containing said gas as a discontinuous phase and said liquid medium as the continuous phase, and maintaining said liquid medium in a fermentation zone under quiescent conditions for a reaction period of about 3 to about 48 hours and at a temperature between about 15° and about 60°C., thus maintaining said bacteria in the exponential growth phase, said period and temperature being sufficient to substantially completely decompose said animal excrement and convert the same to said protein.

2. The method of claim 1 wherein said oxygen-containing gas is air and is admixed with said resultant liquid medium in a proportion from 3/1 to about 40/1 parts air per part of said liquid medium and said liquid medium contains a protective colloid in an amount sufficient to increase the viscosity of said aqueous culture medium to within the range of about 5 to about 200 centipoise at 25°C.

3. The method of claim 2 wherein said protective colloid is a protein.

4. The method of claim 1 wherein said animal wastes are suspended in water, passed to a vessel to permit solid matter to separate from a liquid rich in animal wastes, the solid matter is pulverized and the resultant finely divided solids are passed through a 50 to about 350 mesh screen and suspended in said liquid rich in animal wastes.

5. The method of claim 1 wherein said foam stabilizing additive comprises a biodegradable surfactant, said aerobic bacteria comprises a specie of bacterium capable of degrading said biodegradable surfactant, and said temperature, reaction period and the concentration of said excrement, biodegradable surfactant and bacteria capable of degrading said biodegradable surfactant are controlled to substantially reduce the concentration of said biodegradable surfactant and the stability of said foam during the course of said reaction.

* * * * *